(No Model.)

T. R. BOONE.
CUFF.

No. 297,912. Patented Apr. 29, 1884.

Attest.
John H. Hopkins
R. E. White

Inventor.
Thos. R. Boone,
pr R. F. Osgood,
atty.

UNITED STATES PATENT OFFICE.

THOMAS R. BOONE, OF ROCHESTER, NEW YORK, ASSIGNOR, BY MESNE ASSIGNMENTS, TO CLARA E. BOONE, OF SAME PLACE.

CUFF.

SPECIFICATION forming part of Letters Patent No. 297,912, dated April 29, 1884.

Application filed May 18, 1882. Renewed February 29, 1884. (No model.)

*To all whom it may concern:*

Be it known that I, THOMAS R. BOONE, of Rochester, Monroe county, New York, have invented a certain new and useful Improvement in Cuffs; and I do hereby declare that the following is a full, clear, and exact description of the same, reference being had to the accompanying drawings, in which—

Figure 1:
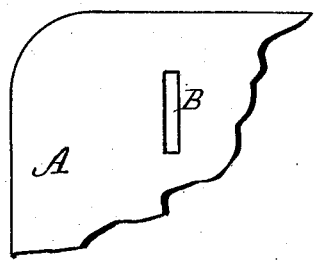
Figure 2:
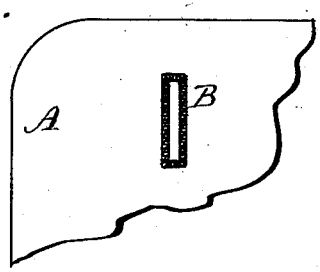
Figure 3:
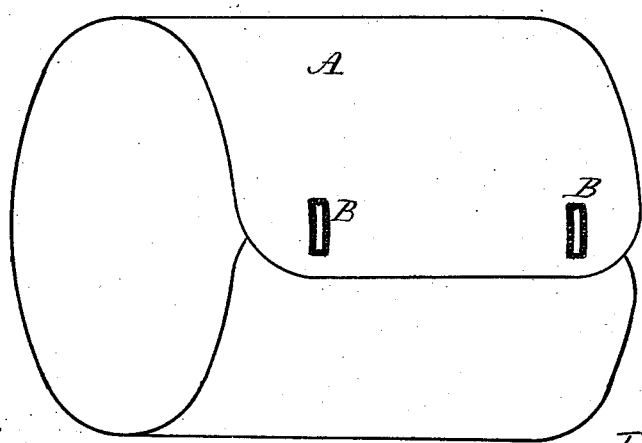

Figure 1 is a plan of one edge of a cuff, showing the blank rectangular opening which forms the button-hole therein. Fig. 2 is a similar view showing the button-hole worked and in a completed state. Fig. 3 is a perspective view of a cuff, showing the improved button-holes.

My improvement relates to the button-holes of cuffs; and it consists of a worked button-hole of rectangular form, having a clear central opening its whole length, and is designed especially for use with a cuff button or fastener of peculiar form which I have invented, for which Letters Patent No. 262,563 were granted to me August 15, 1882; but it may be used with other buttons or fasteners.

In the drawings, A indicates a cuff of ordinary form, and B B are the button-holes. With a suitable instrument I first cut the blank hole shown in Fig. 1. This hole is of rectangular form, of suitable length, and of such width that a clear opening of uniform width is made the whole length. This width is preferably about one-eighth of an inch. After the blank hole is cut, its edges are worked or embroidered in the ordinary manner, as shown in Fig. 2, and the button-hole is completed and in condition for use. The button-hole thus formed presents a clear opening its whole length, even after being starched and ironed, and never closes or becomes stuck together, as in ordinary button-holes. The uniform rectangular opening allows the entrance therein of a square shank of the cuff-button, such as is shown in my improved button before referred to.

I am aware that it is common to cut a circular enlargement at one end of the button-hole, to allow room for the shank of the button; but in such case the main length of the button-hole is simply a slit, and the edges abut, and in starching the edges stick together and give much trouble in inserting the button; and in case a thick shank occupies the whole length of the button-hole, as in my case, the edges are pressed down and forced apart, and much wear comes upon the edges.

This improvement is applicable to collars as well as cuffs.

What I claim as new, and desire to secure by Letters Patent, is—

A cuff or collar having button-holes of rectangular form, worked around their edges, and having a clear space between the edges of substantially uniform width, sufficient to prevent the joining of the edges when the cuff or collar is starched and ironed, substantially as and for the purpose herein specified.

In witness whereof I have hereunto signed my name in the presence of two subscribing witnesses.

T. R. BOONE.

Witnesses:
R. F. OSGOOD,
Z. L. DAVIS.